(12) United States Patent
Ripley et al.

(10) Patent No.: US 11,491,689 B2
(45) Date of Patent: Nov. 8, 2022

(54) PROCESS AND APPARATUS FOR PRODUCING SHAPED PROFILE SECTIONS

(71) Applicant: Kingspan Holdings (IRL) Limited, Cavan (IE)

(72) Inventors: Lynne Ripley, Leominster (GB); Vincent Coppock, Leominster (GB); Stephen C. Gogarty, Leominster (GB); David Oliver, Leominster (GB); Peter Hobbs, Leominster (GB)

(73) Assignee: Kingspan Holdings (IRL) Limited, Cavan (IE)

( * ) Notice: Subject to any disclaimer, the term of this patent is extended or adjusted under 35 U.S.C. 154(b) by 341 days.

(21) Appl. No.: 16/556,493

(22) Filed: Aug. 30, 2019

(65) Prior Publication Data
US 2019/0381707 A1 Dec. 19, 2019

Related U.S. Application Data

(63) Continuation of application No. PCT/EP2018/055295, filed on Mar. 5, 2018.

(30) Foreign Application Priority Data

Mar. 3, 2017 (GB) .................................. 1703466.1

(51) Int. Cl.
*B29C 44/30* (2006.01)
*B32B 1/08* (2006.01)
(Continued)

(52) U.S. Cl.
CPC ............ *B29C 44/321* (2016.11); *B29C 44/30* (2013.01); *B29C 44/324* (2013.01); *B32B 1/08* (2013.01);
(Continued)

(58) Field of Classification Search
CPC .... B29C 44/30; B29C 44/304; B32B 2329/04
See application file for complete search history.

(56) References Cited

U.S. PATENT DOCUMENTS 3,002,876 A * 10/1961 Rosati .................... B31F 1/225
425/336
3,585,678 A 6/1971 Neumann et al.
(Continued)

FOREIGN PATENT DOCUMENTS

| DE | 24 11 396 A1 | 9/1975 |
|---|---|---|
| GB | 965185 A | 7/1964 |
| WO | WO-2004/053380 A1 | 6/2004 |

OTHER PUBLICATIONS

International Search Report and Written Opinion dated Sep. 13, 2018 in corresponding PCT Application No. PCT/EP2018/055295.

*Primary Examiner* — Alison L Hindenlang
*Assistant Examiner* — Debjani Roy
(74) *Attorney, Agent, or Firm* — Harness, Dickey & Pierce, P.L.C.

(57) ABSTRACT

A method for producing a shaped profile section in a continuous line process provides providing an outer facing web, an inner facing web and laying down an liquid foam reactants in the outer facing web. The method pre-forms the outer facing web into a desired outer profile shape prior to laying down the liquid foam reactants. The inner facing web is shaped with the liquid foam reactants within the pre-formed outer facing web to provide a desired inner profile shape for the shaped profile section. Also provided is an apparatus for producing a shaped profile section and a shaped profile section of the method.

13 Claims, 9 Drawing Sheets

(51) Int. Cl.
  *B29C 44/32* (2006.01)
  *B32B 15/04* (2006.01)
  *B32B 15/082* (2006.01)
  *B32B 15/20* (2006.01)
  *B29K 67/00* (2006.01)
  *B29L 23/00* (2006.01)
  *B29C 44/12* (2006.01)

(52) U.S. Cl.
  CPC .......... *B32B 15/046* (2013.01); *B32B 15/082* (2013.01); *B32B 15/20* (2013.01); *B29C 44/1228* (2013.01); *B29C 44/328* (2013.01); *B29K 2067/00* (2013.01); *B29L 2023/225* (2013.01); *B32B 2260/021* (2013.01); *B32B 2260/046* (2013.01); *B32B 2262/0276* (2013.01)

(56) References Cited

U.S. PATENT DOCUMENTS

| | | | | |
|---|---|---|---|---|
| 4,087,501 A | * | 5/1978 | Moser | B29C 44/30 264/269 |
| 2005/0229518 A1 | * | 10/2005 | Ruid | E04B 1/90 52/404.1 |
| 2006/0025295 A1 | * | 2/2006 | Boppel | B41F 25/00 493/395 |
| 2013/0214445 A1 | * | 8/2013 | Garceau | B29C 44/30 425/223 |
| 2015/0233517 A1 | | 8/2015 | Holland | |

* cited by examiner

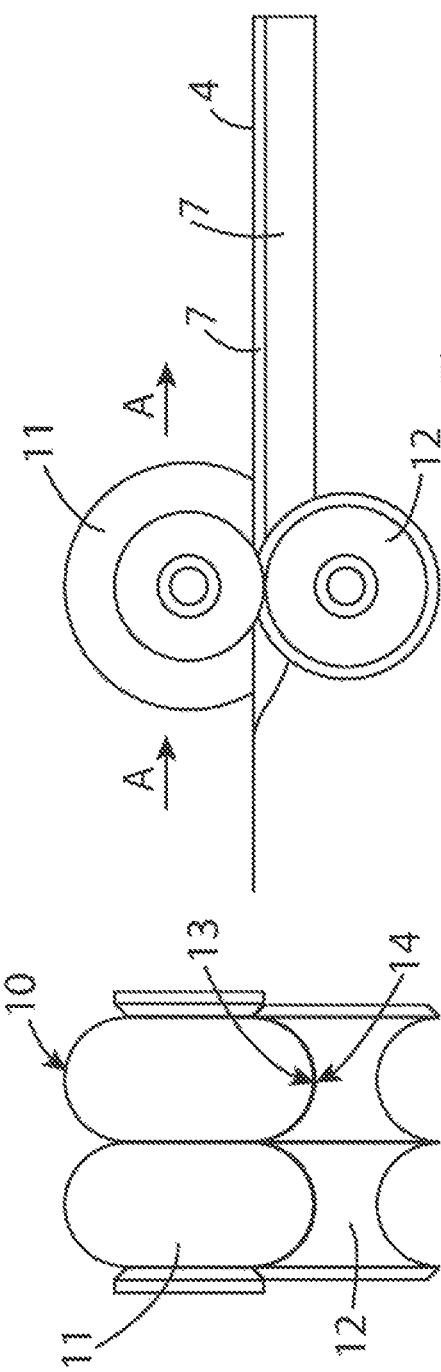

PROCESS AND APPARATUS FOR PRODUCING SHAPED PROFILE SECTIONS

CROSS-REFERENCE TO RELATED APPLICATIONS

This application is a continuation of International Application No. PCT/EP2018/055295, filed Mar. 5, 2018, which claims priority to Great Britain Application No. 1703466.1, filed Mar. 3, 2017. The disclosures of the above applications are incorporating herein by reference.

FIELD

The present disclosure relates to a continuous line process and apparatus for producing shaped profile sections and, more particularly, not exclusively, profiled insulating sections.

BACKGROUND

PCT publication no. WO2004/053380-A1 discloses a phenolic foam pipe insulating section and a process for producing such sections. The pipe insulating section comprises a generally cylindrical hollow phenolic foam body of substantially uniform cross section with an inner facing web and an outer facing web. The phenolic foam body is slit longitudinally to provide section halves that can be opened to facilitate wrapping around a pipe to insulate the pipe. The section halves are linked by the outer web at one side and facing ends of the section halves at the other end are faced with the inner facing web. The process uses an inner mandrel and a number of outer mold sections that are heated to ensure adequate curing of the phenolic foam insulation.

The present disclosure provides an improved continuous line process and apparatus for producing such shaped profile sections.

Accordingly, a method for producing a shaped profile section in a continuous line process comprises the steps of providing an outer facing web; providing an inner facing web; and laying down liquid foam reactants on the outer facing web.

The method further comprises the steps of pre-forming the outer facing web into a desired outer profile shape prior to laying down the reactants. The inner facing web is shaped with foam formed by the liquid foam reactants within the pre-formed outer facing web to provide a desired inner profile shape for the shaped profile section. The liquid foam reactants are suitable for forming thermal insulation foam.

The present disclosure provides an improved method and apparatus for producing a shaped profile section in a continuous line process where the outer facing web is pre-formed into the desired outer shape for the shaped profile section before liquid foam reactants are laid down. The inner facing web is engaged with the outer facing web after the reactants are laid down and, as the foam formed by the liquid foam reactants rises within the pre-formed outer facing web, a desired inner profile shape for the shaped profile section if formed. The preformed outer facing web may have a curvilinear, rectilinear or any other nonlinear shape.

The step of pre-forming the outer facing web may comprise deforming the outer facing web to provide a pair of connected sections. Each section has a substantially C-shaped cross-section.

The step of deforming the outer facing web may further comprise forming a wing at a free end of each C-shaped section.

The step of pre-forming the outer facing web may comprise passing the outer facing web between engaging surfaces of a complementary roller couple. The rollers in each roller couple have inter-fitting convex and concave engaging surfaces.

Desirably, the step of pre-forming the outer facing web comprises passing the outer facing web between surfaces of a series of spaced apart complementary roller couples. The roller couples are positioned so that serially consecutive portions of the outer facing web are sequentially engaged by the roller couples.

Suitably, in the direction of movement of the outer facing web through the roller couples, configuring the engaging surfaces of the series of spaced apart complementary roller couples with rollers of gradually increasing size. Thus, a last roller couple in the series is provided with engaging surfaces corresponding to the shape of the pair of connected substantially C-shaped sections.

The step of pre-forming the outer facing web may be such that the pre-formed outer facing web maintains its shape after the pre-forming step is complete. That is, after the outer facing web passes through the roller couples, it may maintain the desired outer shape of the shaped profile section indefinitely (or until an external force is applied thereto). The pre-formed outer facing web may be self-supporting. It may maintain the desired outer profile shape in the absence of support from an external structure.

As an alternative to, or in addition to, the step of shaping the inner facing web with foam formed by the liquid foam reactants within the pre-formed outer facing web to provide a desired inner profile shape for the shaped profile section may comprise the step of pre-forming the inner facing web into the desired inner profile shape prior to engagement with the outer facing web. The preformed inner facing web may have a curvilinear, rectilinear or any other nonlinear shape.

The step of pre-forming the inner facing web may comprise deforming the inner facing web to provide a pair of connected spaced-apart sections. Each section has a substantially C-shaped cross-section.

The step of deforming the inner facing web may further comprise forming a wing at a free end of each C-shaped section. A connecting portion is between adjacent ends of each C-shaped section.

The step of pre-forming the inner facing web may comprise passing the inner facing web between engaging surfaces of a complementary roller couple. The rollers in each roller couple have inter-fitting convex and concave engaging surfaces.

In an embodiment, the step of pre-forming the inner facing web comprises passing the inner facing web between surfaces of a series of spaced apart complementary roller couples. The roller couples are positioned so that the serially consecutive portions of the inner facing web are sequentially engaged by the roller couples.

Suitably, in the direction of movement of the inner facing web through the roller couples, configuring the engaging surfaces of the series of spaced apart complementary roller couples with rollers of gradually increasing size, such that a last roller couple in the series is provided with engaging surfaces corresponding to the shape of the pair of connected spaced-apart substantially C-shaped sections.

The step of pre-forming the inner facing web may further comprise a micro-ribbing step and/or one or more heating steps.

A micro-ribbing step may be performed prior to passing the inner facing web between the complementary roller couple(s). The micro-ribbing step may comprise passing the inner facing web between two spaced-apart pairs of micro-ribbing rollers to provide a pair of elongate ribs or indentations along the length of the inner facing web. Each rib corresponds to one of the C-shaped sections of the pre-formed inner facing webs. The micro-ribbing step prepares the inner facing web for deformation by the complementary roller couple(s) and allows optimum pre-forming of the inner facing web.

One or more heating steps may be performed prior to passing the inner facing web between the complementary roller couple(s). A micro-ribbing step is performed where the one or more heating steps may be performed after the micro-ribbing step.

The one or more heating steps may comprise an initial heating step comprising passing the inner facing web between a series of heaters to heat the inner facing web to a pre-determined temperature. The temperature may be determined based on the composition of the inner facing web. Preferably, the pre-determined temperature is at least 130 degrees Celsius. In one embodiment, the pre-determined temperature is 260 degrees Celsius. The inner facing web may be formed from a material that is relatively rigid at room temperature. The pre-determined temperature may correspond to a temperature at which the rigidity of the inner facing web is reduced, thereby making deforming of the inner facing web easier.

After the inner facing web passes through the series of heaters, the temperature of the inner facing web will begin to fall below the pre-determined temperature. The one or more heating steps may further comprise a final heating step comprising passing the inner facing web along a heater to heat the inner facing web back to the pre-determined temperature. The step of deforming the inner facing web may be performed while the inner facing web is at or near the pre-determined temperature so that its rigidity is reduced.

The step of pre-forming the inner facing web may be such that the pre-formed inner facing web maintains its shape after the pre-forming step is complete. That is, after the inner facing web passes through the roller couples, it may maintain the desired inner shape of the shaped profile section. The pre-formed inner facing web may be self-supporting. It may maintain the desired inner profile shape in the absence of support from an external structure. As the inner facing web undergoes the roll-forming portion of the preforming step, its temperature falls below the pre-determined temperature and its rigidity therefore increases. This allows it to hold the desired inner shape of the shaped profile section.

The step of laying down liquid foam reactants may comprise operating a delivery head to dispense the liquid foam reactants into the pre-formed outer facing web. The delivery head may be a spray head or a pouring head.

The method may comprise steps of providing an outer facing web mold having a supporting surface shaped to support the pre-formed outer facing web thereon, providing an inner facing web mold configured with a molding surface, arranging the molding surface of the inner facing web mold to face and engage at least a portion of the supporting surface of the outer facing web mold, and conveying the preformed outer facing web with liquid foam reactants and the inner facing web in between the mold surfaces. This provides, from the outer facing web mold to the inner facing web mold, sequential layers comprising the outer web facing web, the liquid foam reactants and the inner facing web.

An advantage of pre-forming the inner facing web is that the shaped profile section may be formed with the exact desired shape. When the inner facing web is shaped only by the foam formed by the liquid foam reactants, the pressure exerted by the foam on the inner facing web may be insufficient to form the facing to the inner facing web mold, resulting in a misshapen profile section. For example, the internal bore of the profile section may be tear-drop or oval in cross-section, instead of circular. By pre-forming the inner facing web such that it maintains the desired shape after the pre-forming step is complete, the requirement for the foam to exert sufficient pressure on the inner facing web to form it to the inner facing web mold is removed. Instead, the pre-formed inner facing web and the inner facing web mold constrain expansion of the foam to ensure that the integrity of the profile is maintained.

The method may comprise providing a mold conveyor arrangement comprising a first rotary conveyor and a second rotary conveyor. A plurality of distinct inner facing web molds are arranged along a perimeter of the first rotary conveyor. A plurality of distinct outer facing web molds are arranged along a perimeter of the second rotary conveyor. The first rotary conveyor and second rotary conveyor are arranged such that the molds move along a conveyor path. Each inner facing web mold engages with an outer facing web mold for at least a portion of the conveyor path.

The molding surface of each inner facing web mold may comprise a pair of spaced apart substantially C-shaped mold plates. Where the inner facing web undergoes a pre-forming step, the inner facing web mold may correspond in shape to the pre-formed inner facing web.

The substantially C-shaped mold plates may be placed in substantial radial alignment within the C-shaped sections of the outer facing web when the molds are engaged along the conveyor path.

Desirably, the foam body formed from the liquid foam reactants is shaped and cured between the inner and outer facing webs while an inner facing web mold is engaged with an outer facing web mold.

The method may desirably comprise a step of applying pressure to one or both of the inner facing web mold and the outer facing web mold for a predetermined period of time to maintain the molds in engagement. Separating the molds along the conveyor path may release the shaped profile section from between the molds.

The method may comprise a step of cutting the shaped profile section to a desired length.

The outer facing web may be provided as one of metal foil. It may include aluminium foil, paper, glass, thermoplastic film or combinations of two or more thereof.

The inner facing web may be made of a thin porous material. Where the inner facing web undergoes a pre-forming step, the inner facing web may comprise fibres bound by a PVA binder. The fibres typically comprise a blend of glass fibres and polyester fibres. Preferably, the at least 50% of the fibres are 50% polyester fibres. In an embodiment, 70% of the fibres are polyester fibres. The polyester content of the inner facing web enables the facing to be thermally formed, that is, by heating and roll-forming the facing.

As outlined above, the liquid foam reactants are suitable for forming thermal insulation foam. Desirably, the liquid foam reactants are suitable for forming phenolic foam, poly-ester foam, poly-ether foam and/or poly-isocyanurate foam.

Advantageously, the method of the disclosure may be used to form insulation foam having excellent thermal insulation properties. For example, the method of the disclosure may be used to form thermoset foam, such a phenolic foam or polyisocyanurate foam. Advantageously, the thermoset foam may have excellent thermal insulation properties.

Suitably, the foams made by the method of the disclosure have a density in the range of from about 10 kg/m$^3$ to about 150 kg/m$^3$. The density may be in the range of from about 20 kg/m$^3$ to about 100 kg/m$^3$, or from 20 kg/m$^3$ to about 60 kg/m$^3$. Foam density may be measured according to BS EN 1602:2013—Thermal insulating products for building applications—Determination of the apparent density.

The foams made by the method of the disclosure are preferably closed cell foams. The foams have a closed cell content of at least 85% as determined in accordance with ASTM D6226. Suitably, the foams made by the method of the disclosure have a closed cell content of at least 90%, such as at least 95%, or at least 97%. Closed cell content may for example be determined using gas pycnometry. Suitable, closed cell content may be determined in accordance with ASTM D6226.

The foams made by the method of the disclosure preferably are formed using blowing agents having low environmental impact and low thermal conductivity. For example, the foams made by the method of the disclosure may be formed using blowing agents such as hydrocarbons, chlorinated hydrocarbons, hydrofluoroolefins or combinations/blends thereof.

The blowing agent may for example comprise a $C_3$-$C_{10}$ hydrocarbon, selected from propane, butane, pentane, hexane, heptane, octane, nonane, decane and isomers thereof. Suitably, the blowing agent may comprise a butane, such as n-butane or iso-butane, or a pentane, such as n-pentane, isopentane or cyclopentane.

The blowing agent may comprise a blend of a $C_3$-$C_{10}$ hydrocarbons, such as a blend of $C_3$-$C_6$ hydrocarbons. For example, the blowing agent may comprise a blend of pentane isomers, e.g. a blend of cyclopentane and isopentane.

The chlorinated hydrocarbon may be a chlorinated propane, such as 1-chloropropane or 2-chloropropane (isopropyl chloride).

The blowing agent may comprise a blend of a $C_3$-$C_{10}$ hydrocarbon and a chlorinated hydrocarbon. For example, the blowing agent may comprise a blend of a $C_3$-$C_6$ hydrocarbon and 2-chloropropane, such as a blend of a pentane and 2-chloropropane.

The hydrofluoroolefin may be 1-chloro-3,3,3-trifluoropropene, 1,3,3,3-tetrafluoropropene, 2,3,3,3-tetrafluoropropene or 1,1,1,4,4,4-hexafluoro-2-butene.

The blowing agent may comprise a blend of a $C_3$-$C_{10}$ hydrocarbon and a hydrofluoroolefin. For example, the blowing agent may comprise a blend of a $C_3$-$C_6$ hydrocarbon and hydrofluoroolefin, such as a blend of a pentane and a hydrofluoroolefin.

SUMMARY

Advantageously, the method of the disclosure may be used to form a thermal insulating foam having an aged thermal conductivity of below 0.0265 W/m·K when measured at a mean temperature of 10° C. after heat ageing for 175±5 days at 70±2° C. when measured in accordance with the procedure specified in European standard BS EN13166:2012. Preferably, the thermal conductivity is 0.022 W/m·K or less, such as 0.020 W/m·K or less, or 0.018 W/m·K or less.

The present disclosure also provide a continuous line apparatus for producing a shaped profile section, the apparatus comprises means for providing an outer facing web; means for providing an inner facing web; means for laying down liquid foam reactants in the outer facing web.

The apparatus further comprises means for pre-forming the outer facing web into a desired outer profile shape prior to laying down the reactants. Means for shaping the inner facing web with foam formed by the liquid foam reactants within the pre-formed outer facing web to provide a desired inner profile shape for the shaped profile section.

The outer facing web may be provided as an elongate web, and the apparatus further comprises means for deforming the outer facing web to provide a pair of connected sections, each section having a substantially C-shaped cross-section.

Desirably, a wing is formed at a free end of each C-shaped section.

Means for pre-forming the outer facing web may comprise a complementary roller couple where rollers in each roller couple have inter-fitting convex and concave engaging surfaces. The outer facing web is passed between the engaging surfaces.

The means for pre-forming the outer facing web may also comprise a series of spaced apart complementary roller couples positioned so that serially consecutive portions of the outer facing web are sequentially engaged between the engaging surfaces of the roller couples.

In the direction of movement of the outer facing web through the roller couples, engaging surfaces of the series of spaced apart complementary roller couples may be configured with rollers of gradually increasing size. Thus, a last roller couple in the series is provided with engaging surfaces corresponding to the shape of the pair of connected substantially C-shaped sections.

As an alternative to, or in addition to, the means for shaping the inner facing web with foam formed by the liquid foam reactants within the pre-formed outer facing web to provide a desired inner profile shape for the shaped profile section, the apparatus may comprise means for pre-forming the inner facing web into the desired inner profile shape prior to engagement with the outer facing web. The preformed inner facing web may have a curvilinear, rectilinear or any other nonlinear shape. In these embodiments, foam formed by the liquid foam reactants is shaped and cured between the inner and outer facing webs while the inner facing web is engaged with an outer facing web.

The means for pre-forming the inner facing web may comprise means for deforming the inner facing web to provide a pair of connected spaced-apart sections. Each section has a substantially C-shaped cross-section.

Desirably, a wing is formed at a free end of each C-shaped section. A connecting portion is formed between adjacent ends of each C-shaped section.

The means for pre-forming the inner facing web may comprise a complementary roller couple where the rollers in each roller couple have inter-fitting convex and concave engaging surfaces. The inner facing web is passed between the engaging surfaces.

The means for pre-forming the inner facing web may also comprise a series of spaced apart complementary roller couples positioned so that serially consecutive portions of the inner facing web are sequentially engaged between the engaging surfaces of the roller couples.

In the direction of movement of the inner facing web through the roller couples, engaging surfaces of the series of spaced apart complementary roller couples may be configured with rollers of gradually increasing size. Thus, a last roller couple in the series is provided with engaging surfaces corresponding to the shape of the pair of spaced-apart substantially C-shaped sections.

The means for pre-forming the inner facing web may further comprise micro-ribbing means and/or one or more heating means.

The micro-ribbing means may comprise two spaced-apart pairs of micro-ribbing rollers between which the inner facing web is passed. This provides a pair of elongate ribs or indentations along the length of the inner facing web. Each rib corresponds to one of the C-shaped sections of the pre-formed inner facing web. The spacing between the micro-ribbing rollers in each pair may correspond to twice the desired thickness of the shaped profile section. The centre of each micro-ribbing roller may be positioned at the point where the centre of the corresponding C-shaped section is to be formed. Each pair of micro-ribbing rollers may be mounted on a telescopic shaft. This allows the spacing between the micro-ribbing rollers in each pair and the positioning of the micro-ribbing rollers relative to the inner facing web (and the inner facing web molds) to be varied. The width of each micro-ribbing roller may correspond to the circumference of the desired corresponding C-shaped section. Each micro-ribbing roller may be made up of one or more planar discs. The width of each micro-ribbing roller may be altered by adding or removing discs. Each micro-ribbing roller may be formed with a serrated edge to provide a discontinuous rib or indentation along the length of the inner facing web. A spacing may be provided between the pairs of micro-ribbing rollers. The spacing is substantially equal to the thickness of the inner facing web.

The one or more heating means may comprise an initial heating means comprising a series of heaters between which the inner facing web is passed to heat the inner facing web to a pre-determined temperature. The temperature may be determined based on the composition of the inner facing web. In one embodiment, the pre-determined temperature is 260 degrees Celsius.

The one or more heating means may further comprise a final heating means comprising a heater along which the inner facing web is passed to heat the inner facing web back to the pre-determined temperature.

The apparatus may comprise a delivery head to dispense the liquid foam reactants into the pre-formed outer facing web. The delivery head is a spray head or a pouring head.

Desirably, the apparatus may comprise an outer facing web mold having a supporting surface shaped to support the pre-formed outer facing web. An inner facing web mold is configured with a molding surface. The molding surface of the inner facing web mold is operable to face and engage at least a portion of the supporting surface of the outer facing web mold. Means are provided for conveying the preformed outer facing web with liquid foam reactants and the inner facing web in between the mold surfaces. This provides, from the outer facing web mold to the inner facing web mold, sequential layers comprising the outer web facing web, the liquid foam reactants and the inner facing web.

Optionally, a conveyor arrangement comprising a first rotary conveyor and a second rotary conveyor. A plurality of inner facing web molds are arranged along a perimeter of the first rotary conveyor. A plurality of outer facing web molds are arranged along a perimeter of the second rotary conveyor. The first rotary conveyor and second rotary conveyor are arranged such that the molds move along a conveyor path. Each inner facing web mold are operable to engage with an outer facing web mold for at least a portion of the conveyor path.

Desirably, the molding surface of each inner facing web mold comprise a pair of spaced apart substantially C-shaped mold plates. The inner facing web is pre-formed. The inner facing web mold may correspond in shape to the pre-formed inner facing web.

The substantially C-shaped mold plates may be placed in substantial radial alignment within the C-shaped sections of the outer facing web when the molds are engaged along the conveyor path.

As the foam formed by the liquid foam reactants rises it may be shaped and cured between the inner and outer facing webs while an inner facing web mold is engaged with an outer facing web mold.

Desirably, the apparatus further comprises means for applying pressure to one or both of the inner facing web mold and the outer facing web mold for a predetermined period of time to maintain the molds in engagement.

Desirably, the apparatus further comprises means for separating the molds along the conveyor path to release the shaped profile section from between the molds.

Means for cutting the shaped profile section to a desired length may be provided.

The present disclosure further provides a shaped profile section produced by the above method and/or apparatus. The shaped profile section may be joined around an outer surface of a pipe.

The present disclosure further provides a mold conveyor arrangement for use in producing a shaped profile section. The conveyor comprises a first rotary conveyor and a second rotary conveyor. A plurality of inner facing web molds are arranged along a perimeter of the first rotary conveyor. A plurality of outer facing web molds are arranged along a perimeter of the second rotary conveyor. The first rotary conveyor and second rotary conveyor are arranged such that the molds move along a conveyor path. Each inner facing web mold is operable to engage with an outer facing web mold for a portion of the conveyor path.

Desirably, each inner facing web mold has a molding surface comprising a pair of spaced apart substantially C-shaped mold plates. Each outer facing web mold comprises a pair of spaced apart substantially C-shaped supporting surfaces.

A preformed outer facing web containing liquid foam reactants and an inner facing web may be conveyed in between the mold surfaces to provide, from the outer facing web mold to the inner facing web mold, sequential layers comprising the outer web facing web, the liquid foam reactants and the inner facing web for the portion of the conveyor path where each inner facing web mold engages with an outer facing web mold.

DRAWINGS

The disclosure will be more clearly understood from the following description thereof given by way of example only with reference to the accompanying drawings in which:

FIG. 1 is a diagrammatic representation view of a continuous line apparatus for producing a shaped profile section.

FIGS. 2(a) and 2(b) are end and plan views of a roller couple for pre-forming an outer facing web.

FIG. 3 is a side view of an outer facing web being pre-formed by the roller couple shown in FIG. 2.

FIG. 4 is an end view of a pre-formed outer facing web.

DETAILED DESCRIPTION

Figure 1:
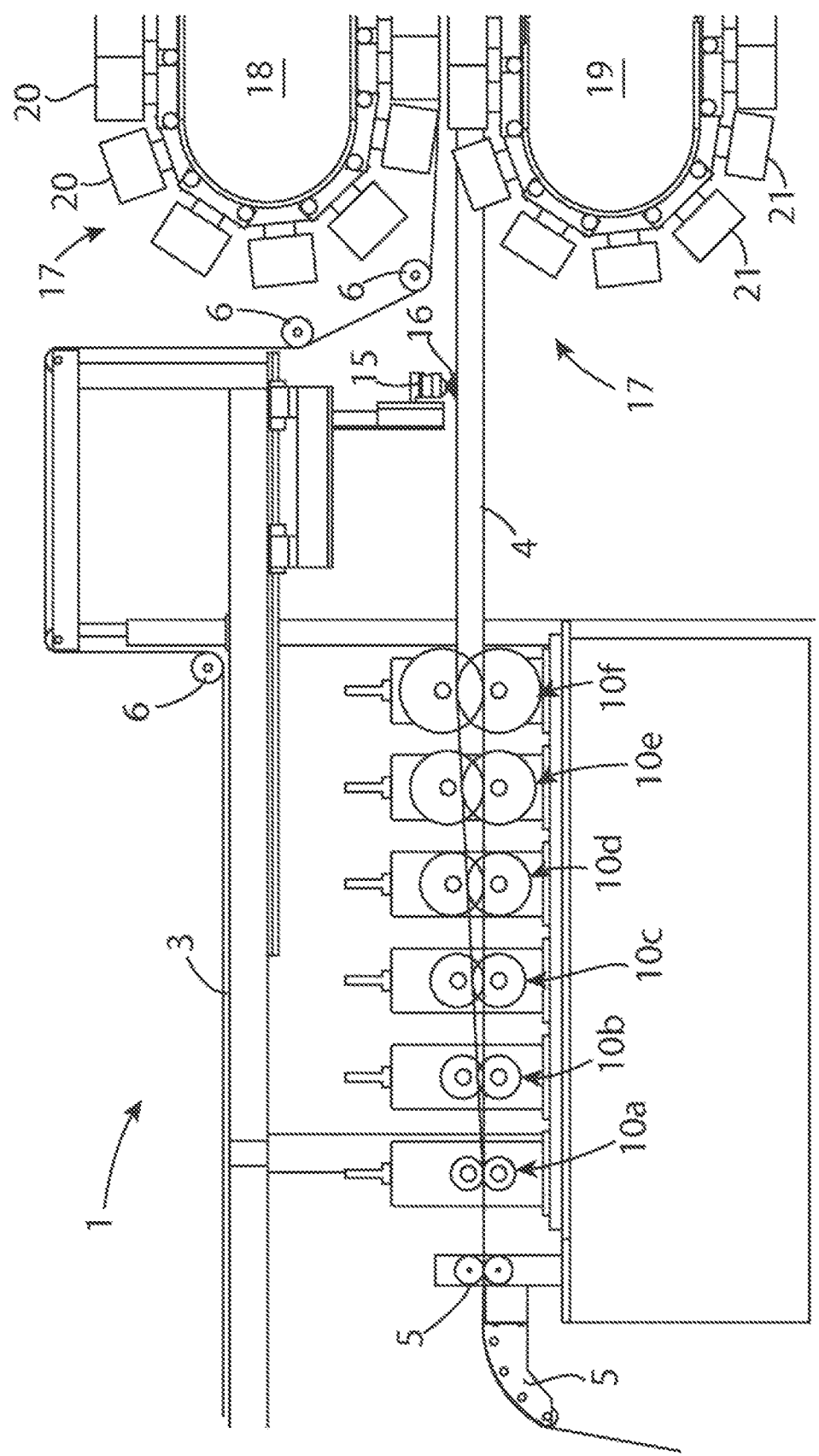

With reference initially to FIGS. 1 to 4, a line apparatus is shown, indicated generally by the reference numeral 1, for continuous production of a shaped profile section (shown in FIG. 9) including an inner facing web 3, an outer facing web 4 and foam body 16 formed by liquid foam reactants between the webs 3, 4.

As shown, the outer facing web 4 is initially provided as an elongate web of material made from metal foil such as aluminium foil, paper, glass, thermoplastic film or combinations of two or more thereof. An arrangement of one or more rollers and/or guides 5, are provided for introducing the outer facing web 4, which may be stored as a roll of material, into the apparatus 1 for pre-forming. The inner facing web 3 is made of a thin porous material. An arrangement of one or more rollers and/or guides, are operable to introduce the inner facing web 3, which may be stored as a roll of material, into the apparatus 1.

The apparatus 1 includes a mechanism for pre-forming the outer facing web 4 into a shape of a pair of connected elongate sections 7. Each section has a substantially C-shaped end view cross-section. A wing 8 is formed and extends from a free end 9 of each C-shaped section in the pair of connected sections 7.

A mechanism for pre-forming the outer facing web 4 includes one or more complementary roller couples 10 with rollers 11, 12. Each roller couple 10 has a roller 11, with convex engaging surfaces 13, and a roller 12, with concave engaging surfaces 14. The surfaces 13, 14 are configured to inter-fit with one another. The outer facing web 4 is thus introduced in between the engaging surfaces 13, 14 of the roller couple 10 in the direction of the arrow 'A'. As the web 4 passes through the roller couple 10, it is deformed and shaped. In the instance shown in FIG. 1, a series of spaced apart complementary roller couples 10a to 10f are provided and positioned so that serially consecutive portions of the outer facing web 4 are sequentially engaged between the engaging surfaces 13, 14 of the roller couples 10. Rollers couples 10 of gradually increasing diameter are provided. The last roller couple 10f in the series is provided with engaging surfaces 13, 14 adapted to the shape of the pair of connected substantially C-shaped sections 7 of the finally pre-formed outer facing web 4.

A delivery mechanism 15 in the form of a spray head or a pouring head is provided. The head lays down or discharges liquid foam reactants 16 in the outer facing web 4, and more particularly, continuously into the C-shaped sections 7 of the pre-formed elongate outer facing web 4 as the outer facing web 4 moves under the delivery mechanism 15. The liquid foam reactants 16 are suitable for forming phenolic foam, poly-ester foam, poly-ether foam and/or poly-isocyanuarate foam. For example, the liquid foam reactants may be suitable for forming phenolic foam or polyisocyanurate foam.

The pre-formed outer facing web 4 containing liquid foam reactants 16 and the inner facing web 3 are then conveyed to a mold conveyor arrangement 17. As shown in FIGS. 5 to 9, the rotary conveyor arrangement 17 includes a first rotary conveyor 18 and a second rotary conveyor 19. A plurality of adjacently arranged inner facing web molds 20 are disposed along a perimeter of the first rotary conveyor 18. A plurality of adjacently arranged outer facing web molds 21 are disposed along a perimeter of the second rotary conveyor 19. For illustrative purposes only, the liquid foam reactants 16 within the outer facing web 4 and the inner facing web 3 are not shown in FIGS. 5 and 6. The rotary conveyors 18, 19 may be provided as a chain link type conveyor including pivotably connected chain links mounting plates 27 operable to mount and convey a respective mold 20, 21 along a substantially rotary conveyor path 'P'.

Figure 5:
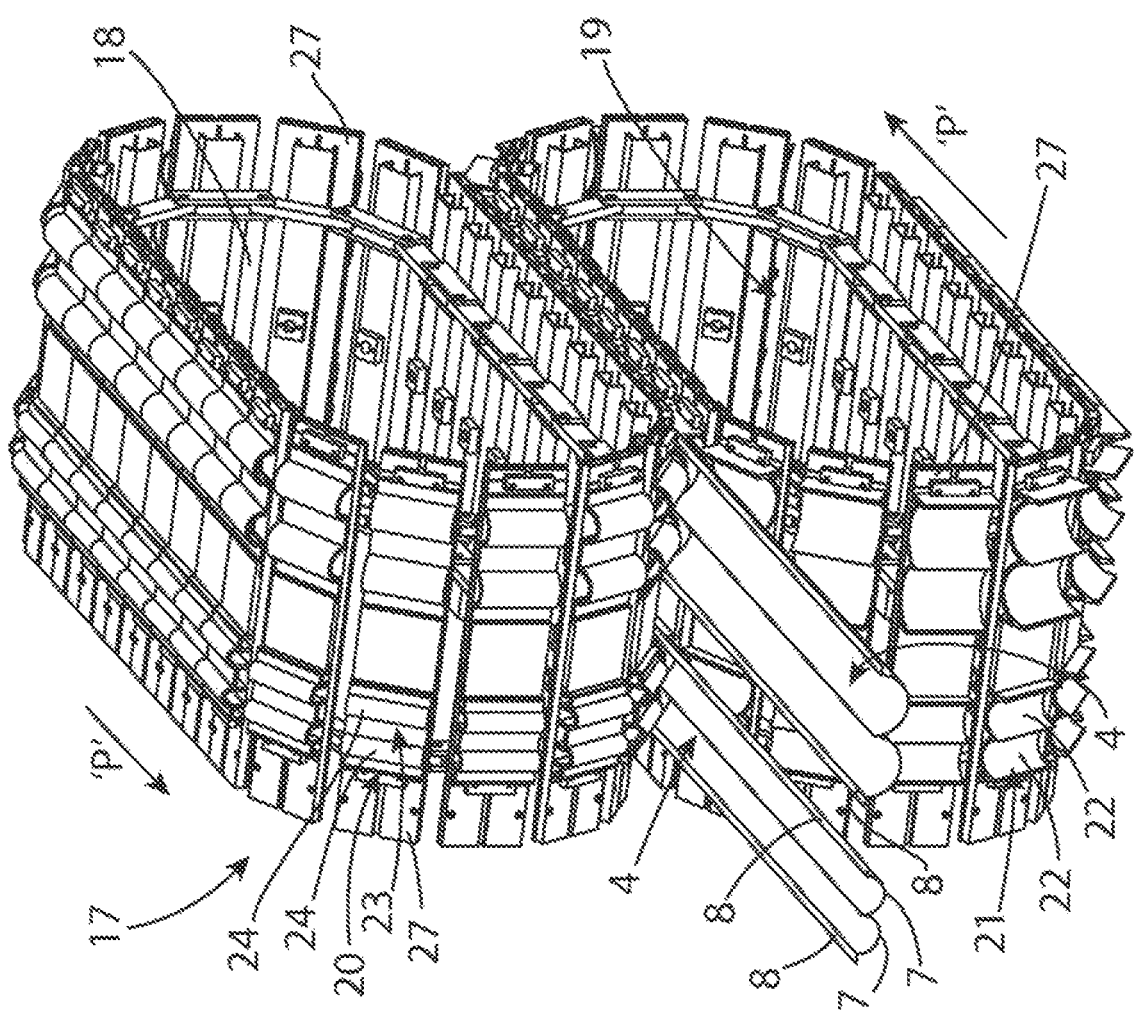
FIG. 5 is a perspective end view of a conveyor arrangement receiving the pre-formed outer facing web (liquid foam reactants and inner facing web are not shown to aid clarity).
Figure 6:
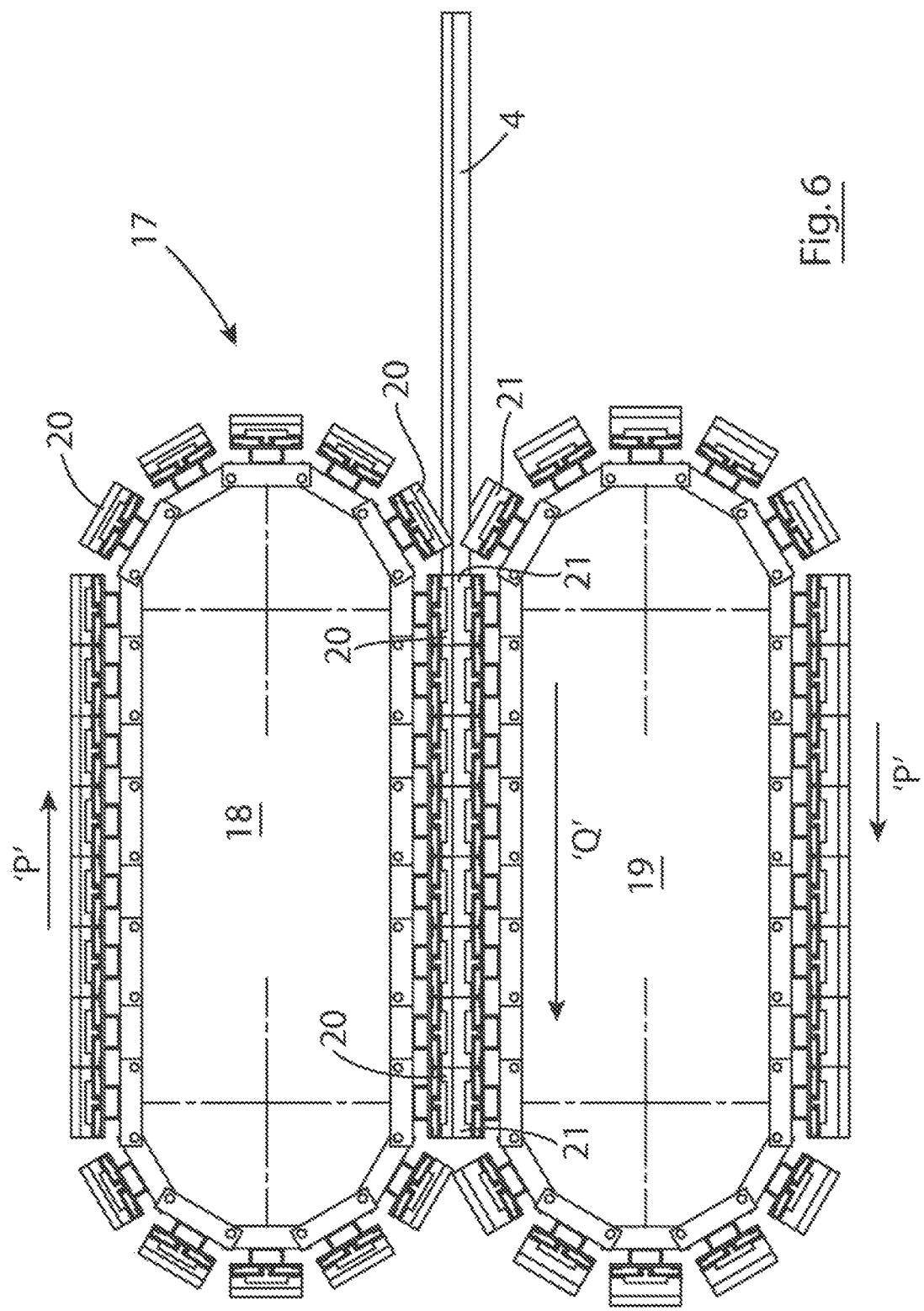
FIG. 6 is a side view of the conveyor arrangement and pre-formed outer facing web shown in FIG. 5 (liquid foam reactants and inner facing web are not shown to aid clarity).
Figure 7:
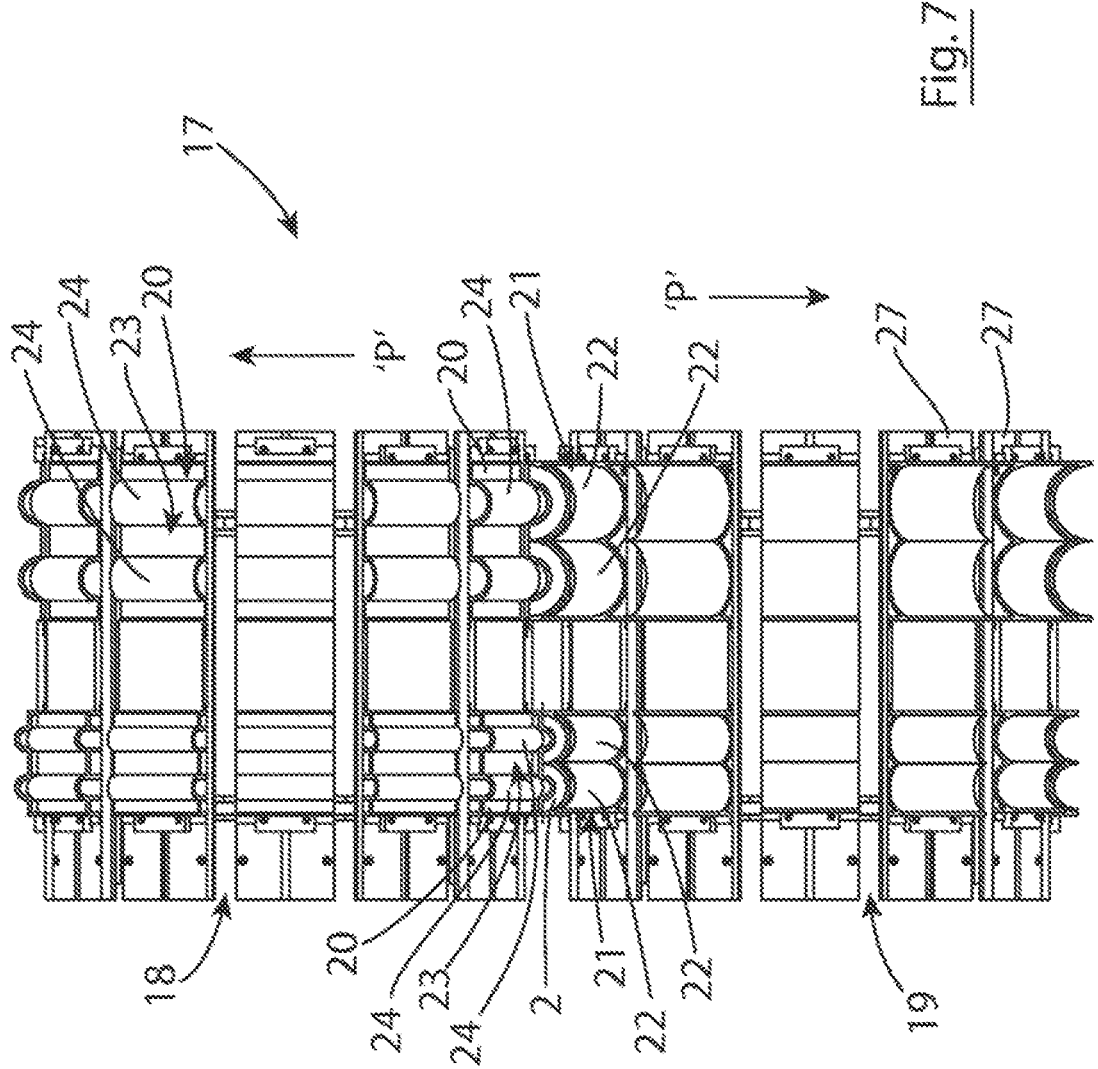
FIG. 7 is an end view of a shaped profile section in the conveyor arrangement shown in FIG. 5.
Figure 8:
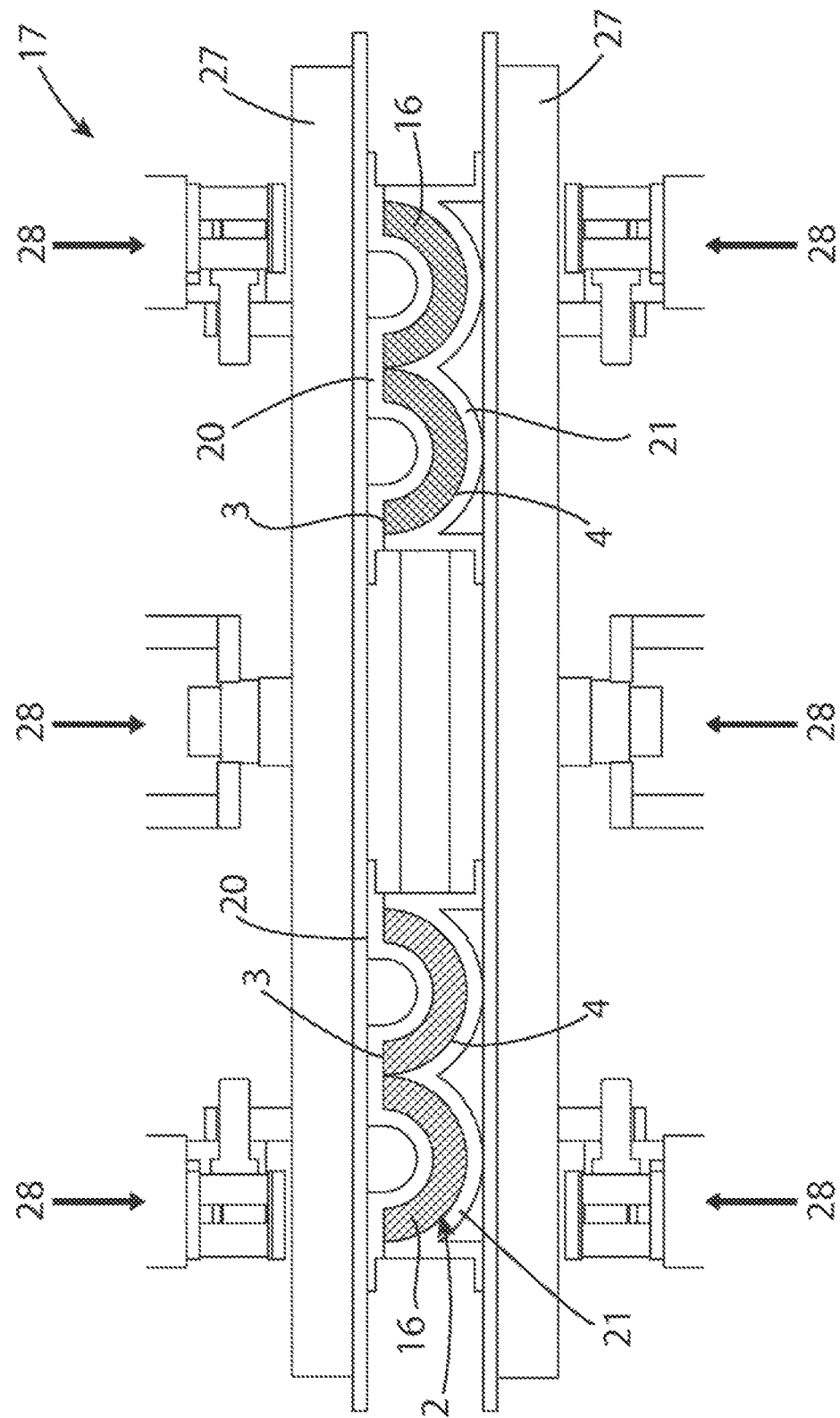
FIG. 8 is an end view of a shaped profile section in a conveyor arrangement.

As shown in FIGS. 5 and 7 in particular, the conveyors includes two separate sets of inner facing web molds and two separate sets of outer facing web molds 21. This enables two shaped profiles of different sizes to be produced simultaneously. The facing web molds are interchangeable. Thus, a set of inner facing web molds 20 and a set of outer facing web molds 21 may be removed from the conveyor and replaced with different sets of inner and outer facing web molds, respectively, to produce a profile of a different size. In this way, the line apparatus may be adjusted to produce profiles of varying sizes without significant alteration of the apparatus.

The first rotary conveyor 18 and second rotary conveyor 19 are arranged such that the molds 20, 21 move along the rotary conveyor path 'P'. Each inner facing web mold 20 is operable to engage with an outer facing web mold 21 along a substantially portion 'Q' of the conveyor path. Each outer facing web mold 21, has a supporting surface 22 that is shaped to support a portion of the pre-formed outer facing web 4. The molding surface 23 of each inner facing web mold 20 includes a pair of spaced apart substantially C-shaped mold plates 24. The outer facing web mold may thus provide a female mold and the inner facing web mold a male mold. It will be appreciated that FIGS. 5 to 8 show an arrangement for conveying a pair of pre-formed outer facing webs 4 and a pair of inner facing webs 3, to thereby produce two runs of separate continuous shaped profile sections 2.

As the molds 20, 21 exit the portion 'Q' of the conveyor path 'P' they are disengaged. It will be understood that along the portion 'Q' of the conveyor path 'P' the molds 20, 21 are positioned in a side by side arrangement to provide a substantially straight through passage for the outer facing web 4 with liquid foam reactants 16 and the inner facing web 3.

In operation, the preformed outer facing web 4, with liquid foam reactants 16 and the inner facing web 3 are conveyed in between the mold surfaces 22, 23. This provides, from the outer facing web mold 21 to the inner facing web mold 20, sequential layers including the outer web facing web 4, the liquid foam reactants 16 and the inner facing web 3.

In one embodiment, the liquid foam reactants 16 include a phenolic resin containing 17% to 22% water and 4% by weight of diethylene glycol as a plasticizer. The resin contains 8% free phenol, and less than 1.5% free formaldehyde, with a viscosity of 2000 cP to 3500 cP at 25° C. The resin is mixed with an acid catalyst and a blowing agent such that the resultant foam has a thermal conductivity of between about 0.0261 and 0.0263 W/mK.

The action of the outer facing web mold 21 engaging with an inner facing web mold 20 at the entry to the portion 'Q' of the conveyor path 'P' brings the mold surfaces 22, 23 into molding engagement. The webs 3, 4 are pinched between surfaces 25 of the inner facing web mold 20 and surfaces 26 of the outer facing web mold 21 to thereby grip and continuously draw the outer facing web 4 and inner facing web 3 through the conveyor arrangement 17. The pinching action between surfaces 25, 26 on the webs 3, 4 further acts to fuse these webs together and to provide a link 27 between the C-shaped sections of the webs 3, 4 and to provide a leak proof seal to stop the liquid foam reactants 16 escaping.

The foam formed by the liquid foam reactants 16 is shaped and cured to form a foam body between the inner and outer facing webs 3, 4 while the molds 20, 21 are engaged along the portion 'Q' of the conveyor path 'P'. In one embodiment, the inner facing web 3 is shaped as the foam rises within the pre-formed outer facing web 4 to provide a desired profile shape for the shaped profile section 1. The action of the liquid foam reactants 16 curing and expanding effectively pushes the inner facing web 3 against the substantially C-shaped mold plates 24 of the inner facing web mold 20 to provide the desired profile for the inner facing web 3 of the shaped profile section 1. In other embodiments, described below, the inner facing web 3 may be pre-formed to the desired profile shape to ensure that the desired shape is achieved. A further function of the inner facing web is to prevent the liquid foam reactants 16 from adhering to the inner facing web mold 20 during the curing process and formation of the foam body between the webs 3, 4.

A mechanism 28, in the form of clamps, is provided for applying pressure to one or both of the inner facing web mold 20 and the outer facing web mold 21 for a predetermined period of time to maintain the molds 20, 21 in engagement. Such a pressure mechanism 28 ensures that the pressure arising in between the molds 20, 21 as the liquid foam reactants 16 cures and expands against the inner facing web 3 is not sufficient to cause the molds 20, 21 to separate. As the molds 20, 21 exit the portion 'Q' of the conveyor path 'P' the molds 20, 21 continue on their respective rotary path 'P' and separate causing the shaped profile section 1 to be released from between the molds 20, 21. A mechanism may be provided for cutting the shaped profile section 1, comprising the webs 3, 4 adhered to the foam body, to a desired length.

In general, the duration of time for which the shaped profile remains between the mold 20, 21 is dependent on the line speed of the apparatus. The slower the line speed, the longer the molds remain in contact with the inner and outer facing webs as they pass through portion 'Q' of the conveyor path. The line speed may be selected to ensure that the profile remains between the molds for sufficient time to allow the foam reactants to cure fully. The line speed may also be limited by other factors such as pouring time for the liquid foam reactants or cutting speed. The duration of time for which the molds remain in contact may range between about 96 seconds and about 320 seconds.

It will be understood that the connected substantially C-shaped sections of the shaped profile section 1 formed according to the disclosure may be joined around a pipe such that the inner facing web 3 engages the outer surfaces of the pipe.

Figure 9:
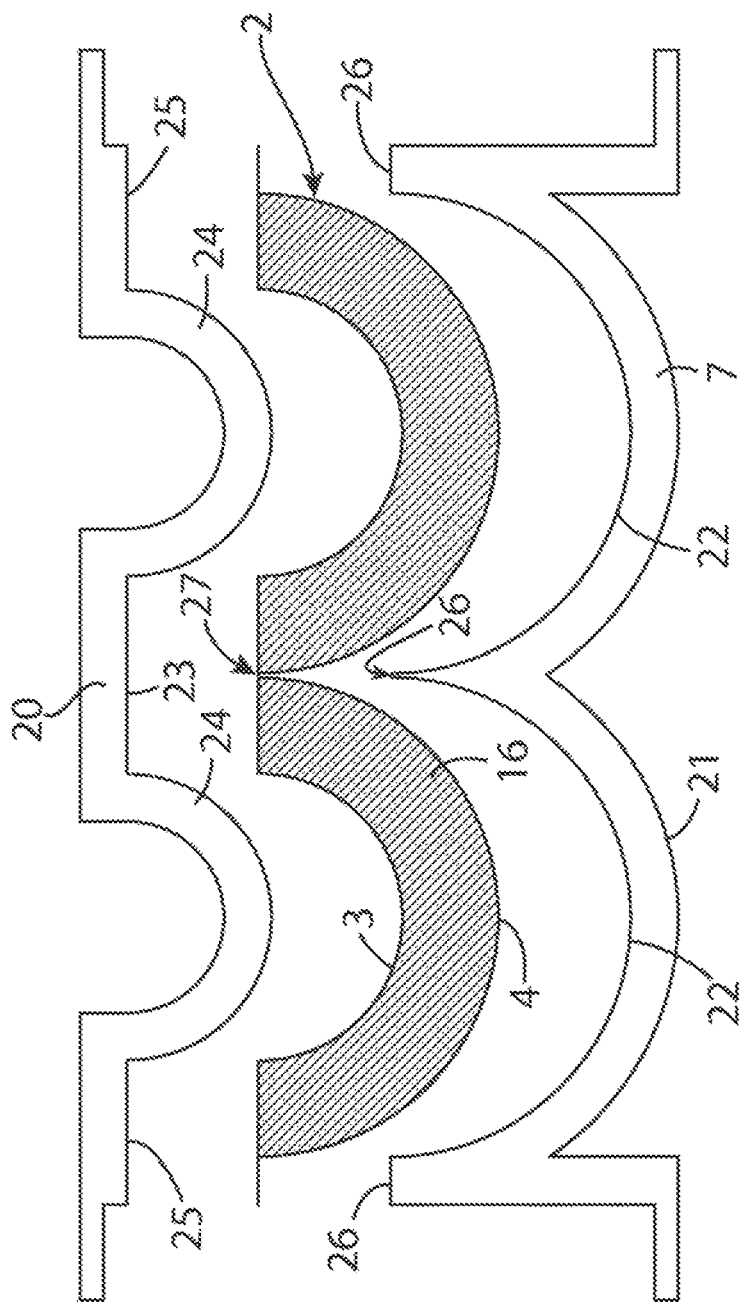
FIG. 9 is an exploded cross-sectional end view of a shaped profile section formed and separate molds of a conveyor arrangement.
Figure 10:
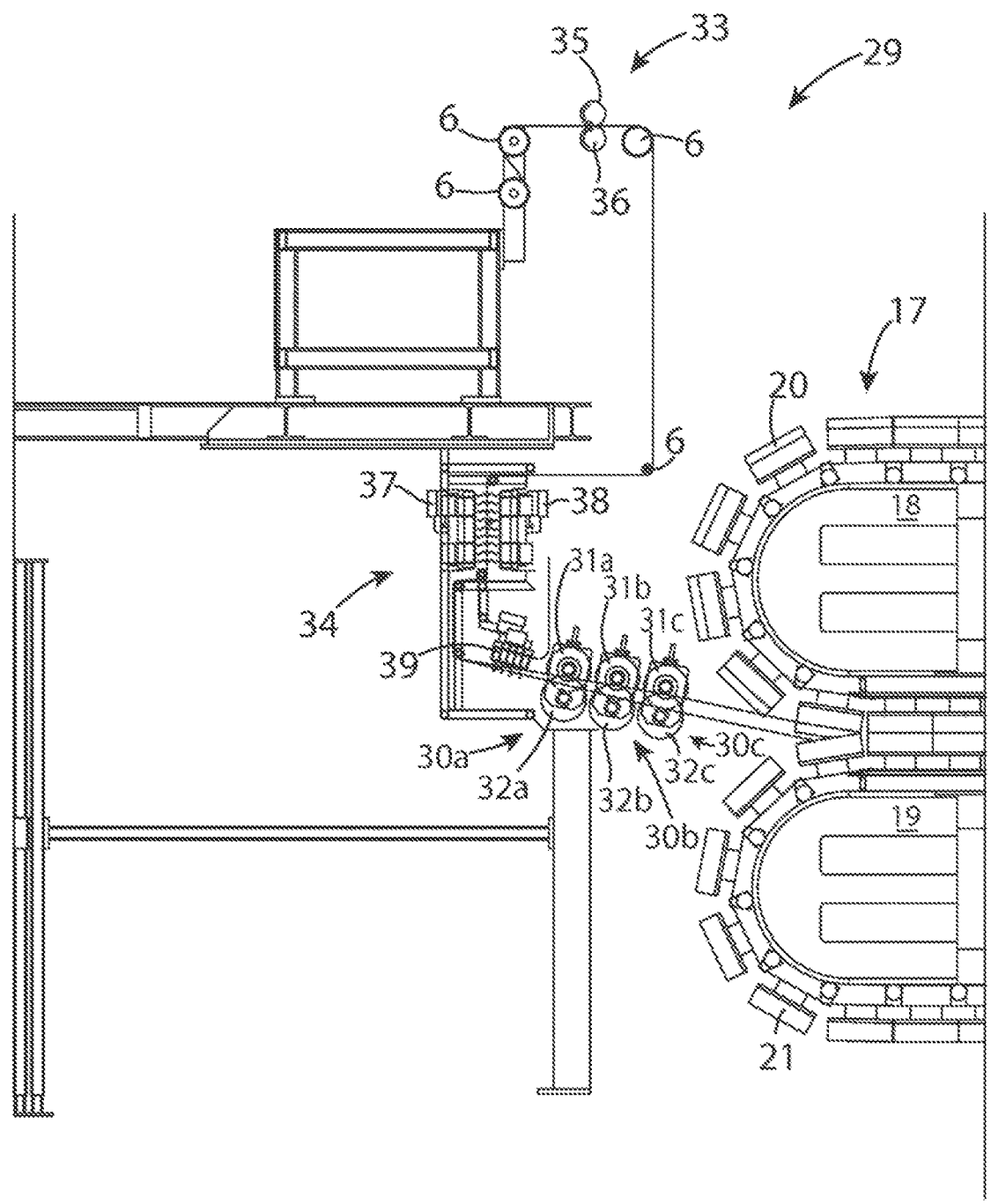
FIG. 10 is a side view of a pre-forming arrangement for an inner facing web (to aid clarity, outer web facing and outer web facing pre-forming means are not shown).
Figure 11:
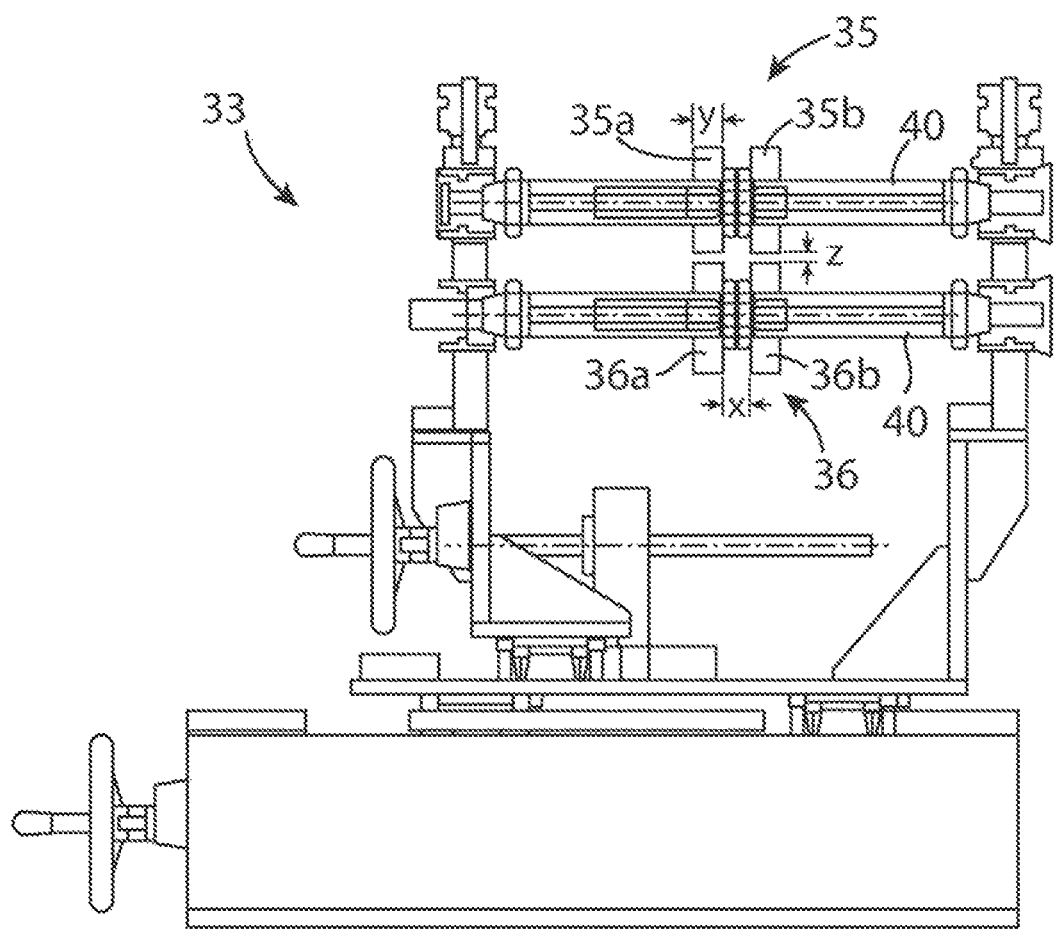
FIG. 11 is an end view of the micro-ribbing arrangement of FIG. 10.

An embodiment of the disclosure including mechanism for pre-forming the inner facing web 3 into the desired inner profile shape prior to engagement with the outer facing web is shown in FIGS. 10 and 11. For purposes of clarity, the outer facing web and the mechanism for pre-forming the outer facing web and the mechanism for laying down the liquid foam reactants are not shown in FIGS. 10 and 11. However, the embodiment of FIGS. 10 and 11 may advantageously be combined with the embodiments shown in FIGS. 1 to 9.

FIG. 10 shows a portion of a line apparatus, indicated generally by the reference numeral 29, for continuous production of a shaped profile section including an inner facing web 3, an outer facing web (not shown) and foam body (not shown) formed by liquid foam reactants between the webs.

As shown, the inner facing web 3 is initially provided as an elongate web of material made from 30% glass fibres and 70% polyester fibres bound by a PVA binder. A mechanism, such as an arrangement of one or more rollers and/or guides 6, are provided to introduce the inner facing web 3, which may be stored as a roll of material, into the apparatus 29 for pre-forming.

The apparatus 29 includes mechanism for pre-forming the inner facing web 3 into a shape of a pair of connected spaced-apart elongate sections. Each section has a substantially C-shaped end view cross-section (as shown in FIG. 9). A wing is formed and extends from a free end of each C-shaped section. A connecting portion is formed between adjacent ends of each C-shaped section.

The mechanism for pre-forming the inner facing web 3 includes a micro-ribbing mechanism. It includes two spaced-apart pairs 35, 36 of micro-ribbing rollers. The inner facing web 3 is passed between the rollers 35, 36 to provide a pair of elongate ribs or indentations along the length of the inner facing web 3. Each rib corresponding to one of the C-shaped sections. The micro-ribbing mechanism 33 is shown in more detail in FIG. 11.

Each pair of micro-ribbing rollers 35, 36 is mounted on a telescopic shaft 40. This enables the spacing X between the micro-ribbing rollers in each pair and the positioning of the micro-ribbing rollers relative to the inner facing web (and the inner facing web molds) to be varied. The spacing X between the micro-ribbing rollers in each pair corresponds to twice the desired thickness of the shaped profile section. The centre of each micro-ribbing roller 35a, 35b, 36a, 36b is positioned at the point where the centre of the corresponding C-shaped section is to be formed.

The width Y of each micro-ribbing roller may correspond to the circumference of the desired corresponding C-shaped section. Each micro-ribbing roller 35a, 35b, 36a, 36b may be made up of one or more planar discs (not shown). The width of each micro-ribbing roller may be altered by adding or removing discs.

Each micro-ribbing roller 35a, 35b, 36a, 36b may be formed with a serrated edge (not shown) to provide a discontinuous rib or indentation along the length of the inner facing web. A spacing Z may be provided between the pairs of micro-ribbing rollers. The spacing is substantially equal to the thickness of the inner facing web 3.

The mechanism for pre-forming may also include heating means 34. The heating means 34 includes an initial heating means including a series of heaters 37, 38. The micro-ribbed inner facing web 3 is passed between heaters 37, 38 to heat the inner facing web to a pre-determined temperature, determined based on the composition of the inner facing web. In the present embodiment, the pre-determined temperature is 260 degrees Celsius.

After the inner facing web passes through the series of heaters 37, 38, the temperature of the inner facing web 3 begins to fall below the pre-determined temperature. The heating means 34 further includes a final heating means including a heater 39. The inner facing web is passed through heater 39 to heat the inner facing web back to the pre-determined temperature. After passing through the heaters 37, 38, 39, the rigidity of the inner facing web 3 is reduced, thereby allowing it to be deformed more easily.

Also provided are one or more complementary roller couples 30. Rollers 31, 32 in each roller couple 30 have a roller 31 with convex engaging surfaces and a roller 32 with concave engaging surfaces (similar to those shown in FIGS. 2 and 3). The engaging surfaces are configured to inter-fit. The heated and micro-ribbed inner facing web 3 is thus introduced in between the engaging surfaces of the roller couple 30. As the web 3 passes through the roller 30 it is deformed and shaped. In the instance shown in FIG. 10, a series of spaced apart complementary roller couples 30a to 30c are provided and positioned so that serially consecutive portions of the inner facing web 3 are sequentially engaged between the engaging surfaces of the roller couples 30. Rollers couples 30 of gradually increasing diameter are provided. The last roller couple 30c in the series is provided with engaging surfaces adapted to the shape of the pair of connected spaced-apart substantially C-shaped sections of the finally pre-formed inner facing web 3.

As shown in FIG. 10, the pre-formed outer facing web 3 is then conveyed to a mold conveyor arrangement 17, similar to that shown in FIGS. 5 to 9. The shape of the inner facing web molds 20 corresponds to the shape of the pre-formed inner facing web. After exiting the complementary roller couples 30, the temperature of the inner facing web 3 is reduced so that it becomes relatively rigid and therefore maintains its pre-formed shape while the foam is shaped and cured, thereby ensuring that the shaped profile has the desired profile shape.

The words "comprises/comprising" and the words "having/including" when used herein with reference to the present disclosure are used to specify the presence of stated features, integers, steps or components but does not preclude the presence or addition of one or more other features, integers, steps, components or groups thereof.

It is appreciated that certain features of the disclosure, which are, for clarity, described in the context of separate embodiments, may also be provided in combination in a single embodiment. Conversely, various features of the disclosure which are, for brevity, described in the context of a single embodiment, may also be provided separately or in any suitable sub-combination.

What is claimed is:

1. A method for producing a shaped profile section in a continuous line process, the method comprising steps of:
   providing an outer facing web;
   laying down liquid foam reactants in the outer facing web;
   engaging an inner facing web with the outer facing web;
   pre-forming the outer facing web into a desired outer profile shape prior to laying down the reactants; and
   pre-forming the inner facing web into a desired inner profile shape for the shaped profile section prior to engagement with the outer facing web, the pre-formed inner facing web maintains its shape in the absence of support from an external structure, after the step of pre-forming the inner facing web is complete.

2. The method as claimed in claim 1, wherein the inner facing web is formed from a material which is relatively rigid at room temperature, the method further comprising:
   heating the inner facing web to a pre-determined temperature where rigidity of the inner facing web is reduced, prior to pre-forming the inner facing web into the desired inner profile shape; and
   allowing the temperature of the inner facing web to fall below the pre-determined temperature during pre-forming of the inner facing web into the desired inner profile shape, the pre-formed inner facing web maintains its shape after the step of pre-forming the inner facing web is complete.

3. The method for producing a shaped profile section as claimed in claim 1, wherein the outer facing web is provided as an elongate web, and the step of pre-forming comprises deforming the outer facing web to provide a pair of connected elongate sections, each section having a substantially C-shaped cross-section; and/or wherein the step of pre-forming the inner facing web comprises deforming the inner facing web to provide a pair of spaced-apart sections, each section having a substantially C-shaped cross-section.

4. The method for producing a shaped profile section as claimed in claim 3, wherein the step of deforming the outer facing web further comprises forming a wing at a free end of each C-shaped section; and/or the step of deforming the inner facing web further comprises forming a wing at a free end of each C-shaped section, and a connecting portion between adjacent ends of each C-shaped section.

5. The method for producing a shaped profile section as claimed in claim 1, wherein the step of pre-forming the outer facing web comprises passing the outer facing web between engaging surfaces of a complementary roller couple where rollers in each roller couple have inter-fitting convex and concave engaging surfaces; and/or wherein the step of pre-forming the inner facing web comprises passing the inner facing web between engaging surfaces of a complementary roller couple where rollers in each roller couple have inter-fitting convex and concave engaging surfaces.

6. The method for producing a shaped profile section as claimed in claim 1, wherein the step of pre-forming the outer facing web further comprises passing the outer facing web between surfaces of a series of spaced apart complementary roller couples positioned so that serially consecutive portions of the outer facing web are sequentially engaged by the roller couples; and/or wherein the step of pre-forming the inner facing web further comprises passing the inner facing web between surfaces of a series of spaced apart complementary roller couples positioned so that serially consecutive portions of the inner facing web are sequentially engaged by the roller couples.

7. The method for producing a shaped profile section as claimed in claim 6, comprising a step of configuring the engaging surfaces of the series of spaced apart complementary roller couples with rollers of gradually increasing size in a direction of movement of the outer facing web through the roller couples, the last roller couple in the series thereof is provided with engaging surfaces corresponding to the shape of the pair of connected substantially C-shaped sections; and/or comprising a step of, configuring the engaging surfaces of the series of spaced apart complementary roller couples with rollers of gradually increasing size in a direction of movement of the inner facing web through the roller couples, such that a last roller couple in the series is provided with engaging surfaces corresponding to the shape of the pair of connected substantially C-shaped sections.

8. The method for producing a shaped profile section as claimed in claim 1, wherein the step of pre-forming the inner facing web further comprises a step of micro-ribbing the inner facing web, wherein the step of micro-ribbing the inner facing web is performed prior to passing the inner facing web between engaging surfaces of a complementary roller couple, or, wherein the step of micro-ribbing comprises passing the inner facing web between two spaced-apart pairs of micro-ribbing rollers to provide a pair of elongate ribs or indentations along the length of the inner facing web, each rib corresponding to one of the C-shaped sections of the pre-formed inner facing web.

9. The method for producing a shaped profile section as claimed in claim 1, wherein the step of pre-forming the inner facing web further comprises one or more heating steps, wherein the one or more heating steps are performed prior to passing the inner facing web between a complementary roller couple, or, wherein the one or more heating steps comprise an initial heating step comprising passing the inner facing web between a series of heaters to heat the inner facing web to a pre-determined temperature, or, wherein the one or more heating steps further comprise a final heating step comprising passing the inner facing web along a heater to return the inner facing web to the pre-determined temperature.

10. The method for producing a shaped profile section as claimed in claim 3, wherein the step of deforming the inner facing web is performed while the inner facing web is at or near a pre-determined temperature.

11. The method for producing a shaped profile section as claimed in claim 1, wherein foam formed by the liquid foam reactants is shaped and cured between the inner and outer facing webs while an inner facing web mold is engaged with an outer facing web mold.

12. The method for producing a shaped profile section as claimed in claim 1, wherein the outer facing web is one of metal foil such as aluminum foil, paper, glass, thermoplastic film or combinations of two or more thereof; and/or wherein the inner facing web comprises fibres bound by a PVA binder.

13. The method for producing a shaped profile section as claimed in claim 1, wherein the liquid foam reactants are suitable for forming phenolic foam, poly-ester foam, poly-ether foam and/or poly-isocyanuarate foam.

\* \* \* \* \*